United States Patent
Trinco et al.

(10) Patent No.: US 10,994,363 B2
(45) Date of Patent: May 4, 2021

(54) DEVICE FOR SHIELDING FROM WELD SPATTER WITH AN INTEGRATED CLEANING SYSTEM

(71) Applicant: Danieli & C. Officine Meccaniche S.P.A., Buttrio (IT)

(72) Inventors: Andrea Trinco, Pradamano (IT); Davide Zilli, Bressa di Campoformido (IT)

(73) Assignee: DANIELI & C. OFFICINE MECCANICHE S.p.A., Buttrio (IT)

(*) Notice: Subject to any disclaimer, the term of this patent is extended or adjusted under 35 U.S.C. 154(b) by 146 days.

(21) Appl. No.: 16/301,859

(22) PCT Filed: Sep. 12, 2017

(86) PCT No.: PCT/IB2017/055476
§ 371 (c)(1),
(2) Date: Nov. 15, 2018

(87) PCT Pub. No.: WO2018/051225
PCT Pub. Date: Mar. 22, 2018

(65) Prior Publication Data
US 2019/0193184 A1 Jun. 27, 2019

(30) Foreign Application Priority Data
Sep. 14, 2016 (IT) .................. 102016000092574

(51) Int. Cl.
 *B23K 9/28* (2006.01)
 *B23K 11/04* (2006.01)
 (Continued)

(52) U.S. Cl.
 CPC ............ *B23K 11/046* (2013.01); *B22D 11/00* (2013.01); *B22D 11/12* (2013.01); *B23D 79/02* (2013.01);
 (Continued)

(58) Field of Classification Search
 CPC ..... B22D 11/00; B22D 11/12; B23K 11/0073; B23K 11/04; B23K 11/046; B23K 11/36;
 (Continued)

(56) References Cited

U.S. PATENT DOCUMENTS

| 4,687,892 A | 8/1987 | Brolin et al. |
| 2010/0072185 A1 | 3/2010 | Mantovan et al. |

FOREIGN PATENT DOCUMENTS

| JP | S5751219 | 3/1982 |
| JP | S59120074 | 8/1984 |

(Continued)

*Primary Examiner* — Hung D Nguyen
(74) *Attorney, Agent, or Firm* — Stetina Brunda Garred and Brucker

(57) ABSTRACT

A device (100) for covering the welding area for hot rolling lines consists of an outer container (1), a protective shield (2), a blade-holder (3) with scraping blades, and an actuator (9). Protection occurs by linearly sliding the protective shield (2) outside the outer container (1) up to minimizing the gaps with the billets. The cleaning occurs at the same time as the return to the rest position: the scraping blades, which are integral with the container (1) and are installed in contact with the inner surface of the protective shield (2), slide thereon during the raising, thus colliding with the deposits of solidified material and removing them. Completing the device (100) additionally is a small alternating linear motion of the protective shield (2) during operation to always keep the attachment area of the scraping blades clean, thus avoiding the need for excessive detachment forces at the beginning of the raising.

11 Claims, 3 Drawing Sheets

(51) Int. Cl.
*B23K 9/32* (2006.01)
*B23K 11/36* (2006.01)
*B23D 79/02* (2006.01)
*B22D 11/12* (2006.01)
*B22D 11/00* (2006.01)

(52) U.S. Cl.
CPC .............. *B23K 9/321* (2013.01); *B23K 11/04* (2013.01); *B23K 11/36* (2013.01)

(58) Field of Classification Search
CPC . B23K 9/26; B23K 9/32; B23K 9/321; B23K 9/328; B23K 37/00; B23D 79/02
USPC ............ 219/97–100, 136, 137.43, 148, 161; 29/270, 278; 269/3, 6, 909; 228/21, 57
See application file for complete search history.

(56) References Cited

FOREIGN PATENT DOCUMENTS

| JP | H10296449 | | 11/1998 |
|----|-----------|---|---------|
| JP | 5446154 | | 3/2014 |
| SU | 1673343 | A1 * | 8/1991 |
| SU | 1719174 | A1 * | 3/1992 |

\* cited by examiner

DEVICE FOR SHIELDING FROM WELD SPATTER WITH AN INTEGRATED CLEANING SYSTEM

CROSS REFERENCE TO RELATED APPLICATION(S)

The present application claims priority to PCT International Application No. PCT/IB2017/055476 filed on Sep. 12, 2017, which application claims priority to Italian Patent Application Nos. 102016000092574 filed Sep. 14, 2016, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a shielding and containment device of splatters resulting from welding operations of billet heads or similar products, for the protection of the surrounding equipment.

STATE OF THE ART

Hot rolling operations on long steel products consist of a series of successive plastic deformations, which bring the generally square or round sections from continuous casting machines or storage areas of semi-finished products—generally called "billets"—to the geometries and dimensions desired.

Upon a possible heating in a furnace, the billets, which lengths generally are comprised for example between 8 and 12 m, cross the different rolling stands in sequence, the number of which varies according to needs, up to reaching the desired result. To this end, rolling lines in which the steps described may be collected and executed in rapid sequence are installed within an industrial scope.

However, this type of process has two recurring problems: the danger of jamming in the inlet steps of the various rolling passes and the need to crop the product. Indeed, since successive activities performed in line are involved, the billet head should be correctly fed at all rolling passes to prevent the whole line from being blocked. In addition to this, there is the loss of material caused by cropping operations, which are cutting operations of the rolled product. Cropping operations are performed necessarily every 4-5 passages in the stand to keep the billet heads hot, which is a necessary condition for the correct performance of the processing. Such cropping operations cause a reduction of the system performance.

A further drawback is caused by the excessive wear of the rolling cylinders at each material inlet, which results in frequent system stops for maintenance, with the reduction of the system use factor and increased operating costs.

Therefore, to prevent possible jammings, losses of material, wear, increased operating costs, and to reduce the operations to be carried out, the continuous rolling of products of undefined length is commonly preferred, such products being obtained by means of billet butt welding, in particular by means of welding between the head of a billet and the tail of another billet.

This butt welding operation may be performed by flashing, by circulating current in the billets and nearing the butts facing one another so as to create a short-circuit: the generation of heat associated therewith results in a melting of the metal, with resulting welding of the two ends. The welding operation is actuated by means of welder machines provided with two structures provided with blocking holders for accommodating billets. A first structure is fixed and the second has slide blocks and both are mounted on a trolley moved at the speed controlled by the rolling line. The slide housing allows the relative distance to be varied between the bodies to be welded up to bringing them into contact. The voltage is supplied by the blocking holders or "electrode holder grippers".

The problems associated precisely with fine-tuning welding—which is not an object of the invention—are not mentioned, while the problems instead are worth noting resulting from the generation of sparks and resulting projection of melted steel particles (splatters) hitting the surrounding structures and being deposited thereon, thus compromising the good operation thereof. Moreover, such deposits are also a danger for the generation of undesired short-circuits, which could even damage other nearby machines.

To avoid this problem, containment devices have been designed using protective shields with two shells having truncated-conical geometry, the upper shell being movable and the lower shell being fixed or movable, with an inner cleaning buffer and the possibility of tilting the movable shell to perform maintenance operations.

However, certain problems not resolved with these devices, remain. A first problem is caused by the excessive distance between the protective shields and the billets, which in any case allows the passage of particle splatters. Such a distance cannot completely be eliminated since the contact between the metal protective shields with the billet could result in an undesired short-circuit. Another problem relates to the conical shape of the walls of the protective shields which reduces the efficiency of the cleaning buffer which is able to only slide on the lower part of said inner walls of the protective shield and which is not able to come out therefrom, therefore not allowing the cleaning of the inlet and requiring in any case manual maintenance operations to be performed. Finally, the melted steel splatters directly hit the buffer, thus forming solid deposits which slowly reduce the cleaning action thereof on the walls.

Patent US2010072185A1 discloses a splatter shield device which uses two cylindrical-shaped protective shields moved by multiple linkages according to trajectories shaped like portions of circumference. The machine is also provided with a sliding buffer and a protective guillotine to protect the buffer when it is not operating.

The cylindrical section of the protective shields facilitates the work of the buffer which may perform the cleaning on the whole length, thus also succeeding in restoring the inlet of the upper protective shield without requiring manual interventions.

Protective shields have a section for the passage of the billet therein, but such an inlet opening has slightly larger dimensions with respect to the outlet opening so as to cancel the meatus with one of the billets and to keep it, albeit reduced, with the outlet opening so as not to incur short-circuits.

A great disadvantage of this solution however is the complexity of the configuration which has four actuators—two for moving the shells, one for the buffer and one for the guillotine—and the significant number of components involved, which is a disadvantageous factor in an operative ambient where the temperature is quite high.

Therefore, the need is felt to find a kinetically simpler and more affordable solution.

SUMMARY OF THE INVENTION

It is therefore an object of the present invention to provide a more affordable and efficient solution for a containment and shield device for protecting from splatters and sparks resulting from butt welding of billets in rolling lines in order to overcome breakdowns and short-circuits in the machinery adjacent to the welding area.

It is a further object of the invention to provide said containment and shield device with an integrated cleaning system of the welding splatter deposits.

These and other objects, which will be apparent from reading the description, are achieved by means of a splatter shield device for protecting from splatters resulting from welding billets which, according to claim 1, defines a rectilinear longitudinal axis Z, and comprises a protective shield having a first inner cavity defined by first inner surfaces, comprising a hole for the passage of billets at an outer side of the protective shield; a cleaning device for cleaning the first inner surfaces, arranged in the first inner cavity; actuating means for causing sliding movements of the protective shield with respect to the cleaning device, in a direction parallel to the rectilinear longitudinal axis Z.

Preferably, as further explained, the cleaning device is fixed in position, while the protective shield can be linearly moved by the actuating means.

For example, the cleaning device is fixed by means of fixing means to a fixed part of the actuating means, while the protective shield is fixed to a movable part of the actuating means.

According to another aspect of the invention, the aforesaid problems are resolved by means of a cleaning method of a splatter shield device as described above, which, according to claim 11, comprises the following steps: arranging the shield device above the welding surfaces, preferably perpendicular to the feeding line of the billets to be welded; causing the protective shield to slide from a rest position thereof in a direction parallel to the rectilinear longitudinal axis Z so as to arrange the hole for the passage of billets around the billets; performing a butt welding operation between two successive billets; at the end of the butt welding operation, returning said protective shield to the rest position by a sliding movement in a direction parallel to the rectilinear longitudinal axis Z.

Due to the solution of the device of the invention, advantages are obtained of simplicity and affordability by reducing the number of components involved by using only one actuator and simplifying the operation thereof, thus overcoming the complexity of similar devices of the prior art. In particular, only the protective shield is caused to translate by the actuating means, preferably a linear actuator, which allows the movement thereof along a rectilinear trajectory, preferably only along a rectilinear trajectory.

Advantageously, the protective shield is the only movable element in the device of the invention and it is linearly translated by the actuator during the operation towards the surface to be welded so as to absolve its role to protect the ambient immediately surrounding the butt welding system.

The cleaning device, which preferably is a scraping tool, is substantially fixed in position. The relative movement between protective shield and cleaning device is obtained because it is the protective shield that moves, while the cleaning device is stationary.

In particular, once the welding operation is complete, the protective shield is recalled to retract to the rest position, an action which results in the contact of the inner surface of the shield with the scraping tool, thus performing the cleaning action of the solidified melted metal deposits adhering to the inner surface of the protective shield.

A further advantage of the invention is given by the fact that the protective shield moves along a rectilinear trajectory. Thereby, actuating means can be used, e.g. a cylinder-piston system, which is easy to manufacture and is not very cumbersome, in particular in comparison to linkages.

The dependent claims refer to preferred embodiments of the invention which is object of the independent claims.

BRIEF DESCRIPTION OF THE DRAWINGS

Further features and advantages of the weld spark and splatter shield device of the invention will become more apparent in light of the detailed description of preferred, but not exclusive, embodiments of a device according to the invention, shown by way of non-limiting example with the aid of the accompanying drawings, in which.

The same numbers in the figures correspond to the same elements or components.

DETAILED DESCRIPTION OF EMBODIMENTS OF THE INVENTION

Figure 11:
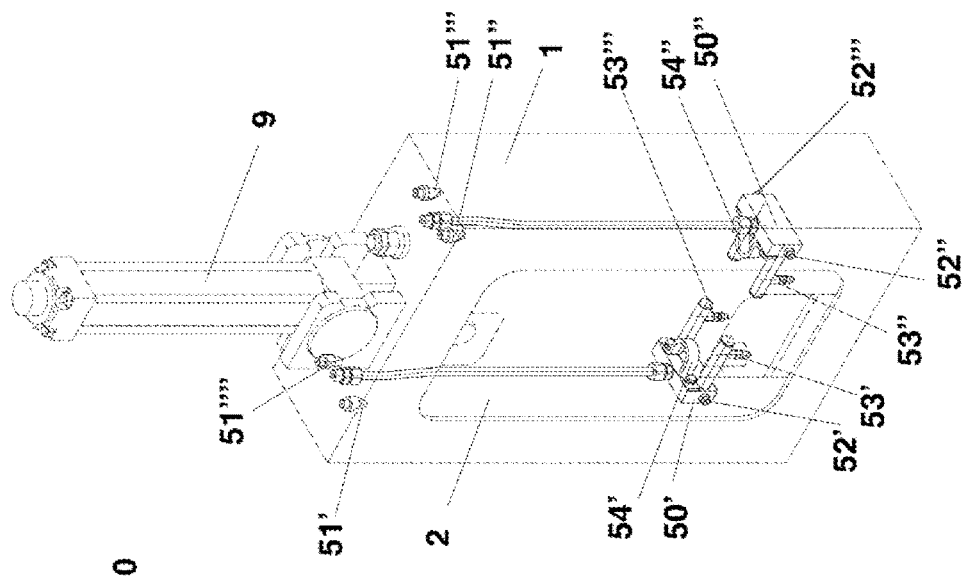
FIG. 11 shows an axonometric view in which the elements were drawn with dotted lines to highlight the cooling system.

With particular reference to the drawings, a containment device for protecting against sparks and weld splatter, according to the invention, indicated overall with 100, comprises an outer container 1, also called outer casing or container, for example, parallelepiped in shape having rectangular cross section, and having an inner cavity which is open at the upper and lower sides with respect to the ground. The outer container 1 is formed by four plates which have four respective inner surfaces 15, 16, 17, 18 delimiting the inner cavity and defining the rectilinear longitudinal axis Z.

A protective shield 2 is arranged in the inner cavity of the outer container 1 and preferably substantially has similar shape thereto, with the axis of longitudinal symmetry thereof coinciding with the longitudinal axis Z. Moreover, the protective shield 2 has outer dimensions compatible with the ones of the inner cavity of the outer container 1, so as to slide in the inner cavity of container 1 along a direction parallel to the longitudinal axis Z. Space 35, which separates the inner surfaces of the outer container 1 and the outer surfaces of the protective shield 2, is adjusted to the type of metal used and to the operating temperatures, which are determining factors for the entity of the expansion of the different elements forming the shield device. These considerations are within the reach of those skilled in the art. The inner surfaces 15, 16, 17, 18 of the outer container 1 thus face the corresponding outer surfaces 19, 20, 21, 22 of the protective shield 2.

Alternatively to the parallelepiped shape of the outer casing 1 and of the protective shield 2, other forms may also be selected (not shown in detail in the drawings), for example cylindrical, prismatic, mixed with some flat walls and other curved ones, as long as the overall shape of the elements is in any case complementary to and allows the sliding movement of the protective shield 2 in the outer container 1.

The protective shield 2 has a passage hole 23, or section, along lower edges, which replicates the cross section of the billets to be welded in order to allow the passage of the aforesaid billets in a direction orthogonal to the plane of largest extension of the shield device 100, and therefore also to axis Z.

Actuator 9 moves the protective shield 2 in its sliding movements with respect to the outer casing 1 under the control of a control system, which is not further described since such systems are of common use in systems of the types of the ones in which the device of the invention is used.

Two connection flanges 10 and 10' use a cover plate 12 to achieve the assembly of the outer container 1 to the fixed surface of actuator 9, while pin 14 connects the rod 28 of actuator 9 with the protective shield 2, thus transmitting to them the motion which allows both the short-stroke and long-stroke linear sliding movements in both directions along a direction parallel to axis Z.

The upper cover 12 preferably is rectangular-shaped and is arranged to close the outer container 1, and has a hole of adequate dimensions for the passage of actuator 9, in particular of rod 28.

A cleaning device or cleaning tool, preferably a scraping tool, for cleaning the inner surfaces 24, 25, 26, 27 of the protective shield 2 is arranged in the inner cavity of the protective shield 2. Preferably, the cleaning device comprises a flange, also called blade-holder flange 3, to which scraping blades 4, 5, 6, 7 are fixed.

In particular, by using connection systems comprising at least one rod, for example two rods 13' and 13" parallel to the longitudinal axis Z may be used, the blade-holder flange 3 is fixed in an integral and rigid manner to the upper cover 12 in the inner cavity of the protective shield 2. The blade-holder flange 3 has side surfaces inclined by an angle other than null with respect to the longitudinal axis Z, so as to define a body having truncated-pyramidal geometry on the sides of which four scraping blades 4, 5, 6, 7 are accommodated, one for each side of the blade-holder flange 3. The scraping blades 4, 5, 6, 7 are metal blades, advantageously having trapezoidal shape seen on the plane of largest extension thereof, which perform the cleaning action of the respective inner surface of the protective shield 2. The scraping blades 4, 5, 6, 7 are mounted on the tapered surface of the blade-holder flange 3, in the upper portion, and rest on a stiffening plate 8 in the area where the scraping edges thereof are, at least during the operative steps. The stiffening plate 8 has preferably rectangular cross section on the plane of largest extension thereof, and serves to limit the deformation of the scraping blades 4, 5, 6, 7 during the action on the material to be removed, which requires high contact pressures and occurs in a high-temperature operative ambient. The use of the stiffening plate 8 improves the cleaning action of the system and may be easily replaced and cleaned during regular maintenance. Moreover, the stiffening plate 8 protects the inner part of the cleaning device from splatters. The fastening of the scraping blades 4, 5, 6, 7 on the inclined sides of flange 3 results in the contact with the surfaces 24, 25, 26, 27 within the protective shield 2, with an acute angle conveniently selected which promotes the scraping and cleaning action of the protective shield 2. In other words, the four scraping blades 4, 5, 6, 7 are inclined with respect to the respective inner surface 24, 25, 26, 27.

Figure 4:
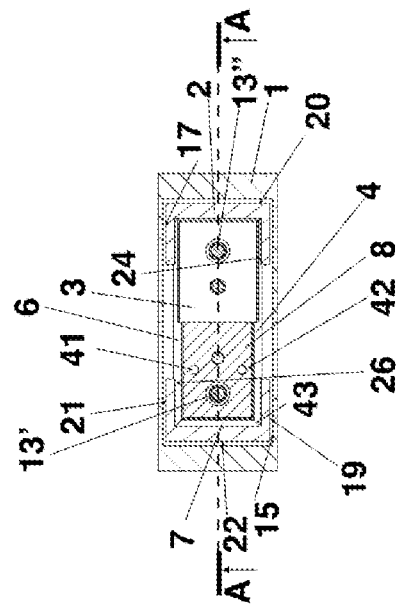
FIG. 4 shows a sectional view of the scraping tool according to broken plane B-B in FIG. 5, in rest position.
Figure 3:
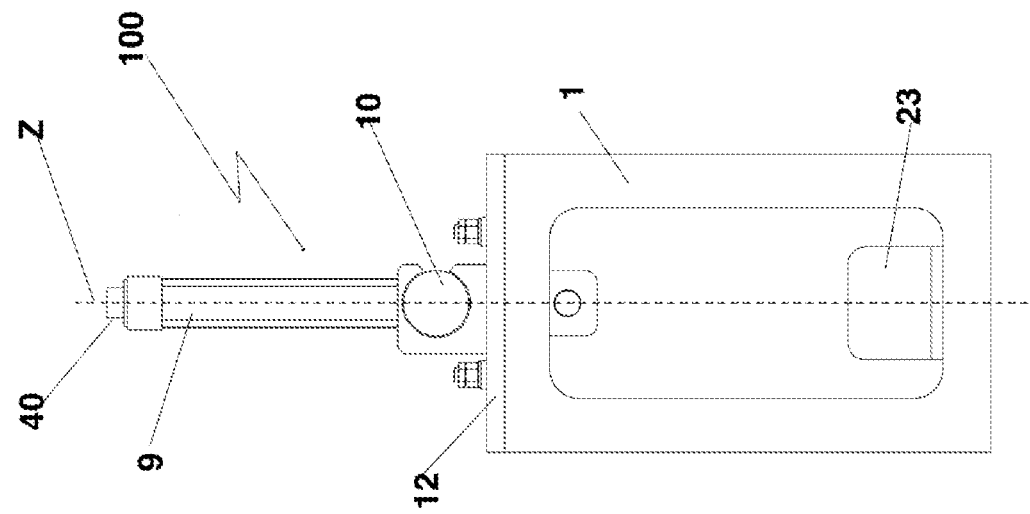
FIG. 3 shows the front view in rest position.
Figure 7:
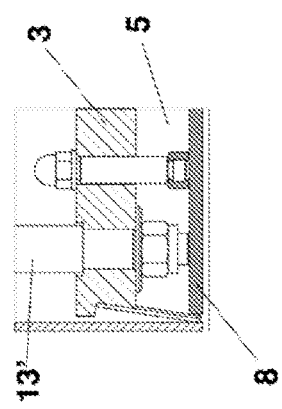
FIG. 7 shows an enlarged detail of FIG. 6.
Figure 9:
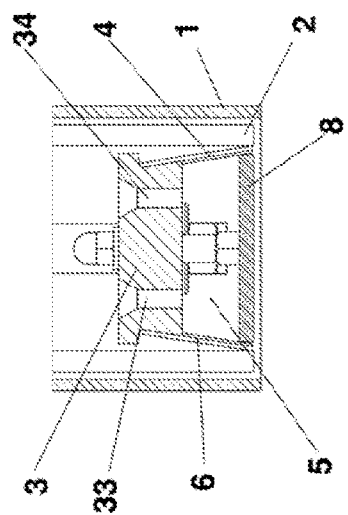
FIG. 9 shows an enlarged detail of FIG. 6.

Advantageously, the scraping blades 4, 5, 6, 7 are sized with a suitable geometry and such as to generate a preloading thereof against the inner surfaces 24, 25, 26, 27 of the protective shield 2. The preloading system is made for example, by providing a small empty space between those inclined sides of the trapezoidal blades which are at the four edges of the truncated pyramid. In FIG. 4, one of the four edges is indicated with reference numeral 43, which is the joining edge between the blades 4 and 7. The other three edges are not indicated in the drawings for reading clarity of the drawings, but it is apparent that the arrangement and the dimensions selected at edge 43 are repeated in a similar manner for the other three edges forming the truncated pyramid. The scraping blades 4, 5, 6, 7, with their scraping edges, have a slightly larger dimension than the dimensions of the inner cavity of the protective shield 2, and when the protective shield 2 is moved by an action of actuator 9, a relative sliding movement is generated between the cleaning tool and the protective shield 2. According to such a related movement, the cleaning tool, together with the scraping blades 4, 5, 6, 7, moves within the inner cavity of the protective shield 2, thus generating a bending force which bends the blades. The presence of the empty space between adjacent blades at edge 43 and at the other three edges not referenced in the drawings, allows such a bending of the blades. This bending, which occurs in direction transverse to axis Z, corresponds with a return force in opposite direction generated by the elasticity of the metal with which the scraping blades are made, resulting in the mentioned preloading force.

Thereby, a contact is ensured with high local pressure caused by the preloading force between the inner surfaces 24, 25, 26, 27 of the protective shield 2 and the scraping blades 4, 5, 6, 7 during the cleaning steps.

The blade-holder flange 3 and the scraping blades 4, 5, 6, 7 contain holes 33, 34, 41, 42 which are adapted to the passage of a refrigerant fluid for controlling the operating temperature of the device.

With particular reference to FIG. 11, a possible advantageous but not exclusive configuration of the cooling system comprises the manifolds 50', 50" fixed on the rods 13' and 13" by means of the plates 54' and 54", and nozzles, the number and arrangement of which may vary according to specific needs.

In the configuration illustrated, there are installed upper nozzles 51', 51", 51''', 51'''' mounted directly on the upper cover 12, side nozzles 52', 52", 52''' and lower nozzles 53', 53", 53''' mounted on the manifolds 50' and 50". Certain nozzles (shaded in the drawings) are not referenced with numbers but the arrangement thereof is apparent to those skilled in the art, as is also a different arrangement thereof, which is defined according to the cooling needs.

By connecting the nozzles and the manifolds to a device external to the invention capable of sending the refrigerant fluid thereto, the cavity identified by the surfaces 24, 25, 26, 27 is sprinkled by the fluid. The holes 33, 34, 41, 42 of the blade-holder flange 3 allow also sprinkling the scraping blades 4, 5, 6, 7.

Without departing from the scope of the invention described, an alternative embodiment of the shield device of the invention (not shown in the drawings) does not have the outer container. The shield device comprises in this case, the protective shield 2 with the outer walls 19, 20, 21, 22 exposed, in particular exposed without other plates or elements. As already mentioned above, the fixed part of actuator 9 here is fixed integrally to the rods 13' and 13" and thereby to the blade-holder flange 3, and rod 28 is fixed to the protective shield 2. This variant has the advantage of a lower production cost and it weighs less.

In alternative variants to the ones described above, the shield device of the invention may be arranged both in vertical direction and with axis Z inclined by an acute angle with respect to the vertical direction, whether it is provided with the outer casing 1 or not. This last variant is not shown in the drawings since it is an embodiment apparent to those skilled in the art. Here, it is apparent for those skilled in the art that operation occurs in direction parallel to axis Z, which is inclined with respect to the vertical and preferably is perpendicular to the feeding line of the billets. However, device 100 may also be arranged with axis Z inclined by an angle ranging between 0° and 30° with respect to the surface to be welded, without departing from the scope of the present invention.

The assembly of the shield device of the invention and the operation thereof are described in greater detail below.

The list indicated is to be considered exclusively an explanation of the preferred configuration, but is not limiting for the invention.

The outer container 1, the blade-holder flange 3, the scraping blades 4, 5, 6, 7 and the stiffening plate 8 are integral and fixed to an outer support structure (not shown in the drawings), and the body of actuator 9 also is fixed to the outer support structure. This outer support structure, which carries the shield device 100, advantageously is fixed, but it could alternatively be movable, without departing from the scope of the invention. The protective shield 2 translates linearly during operation due to the action of the rod 28 of actuator 9.

Figure 2:
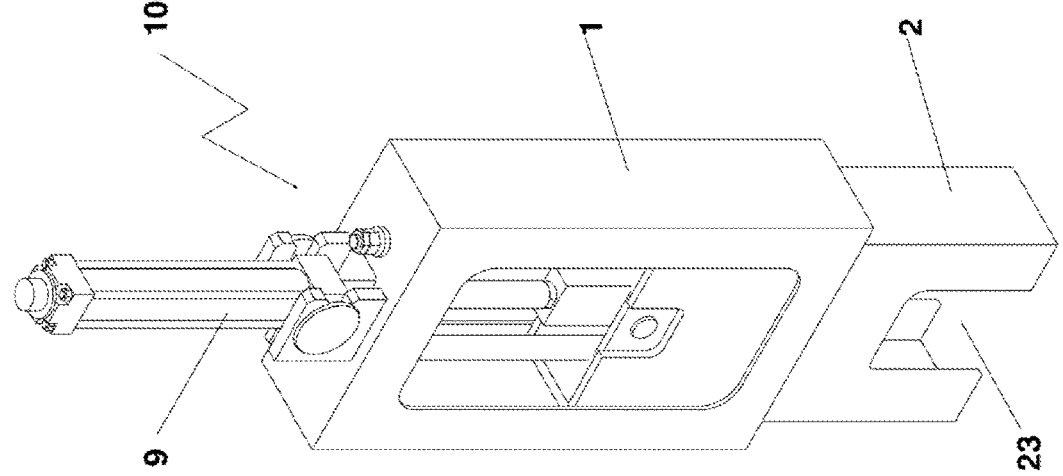
FIG. 2 instead shows an axonometric view of the complete device in work position.
Figure 1:
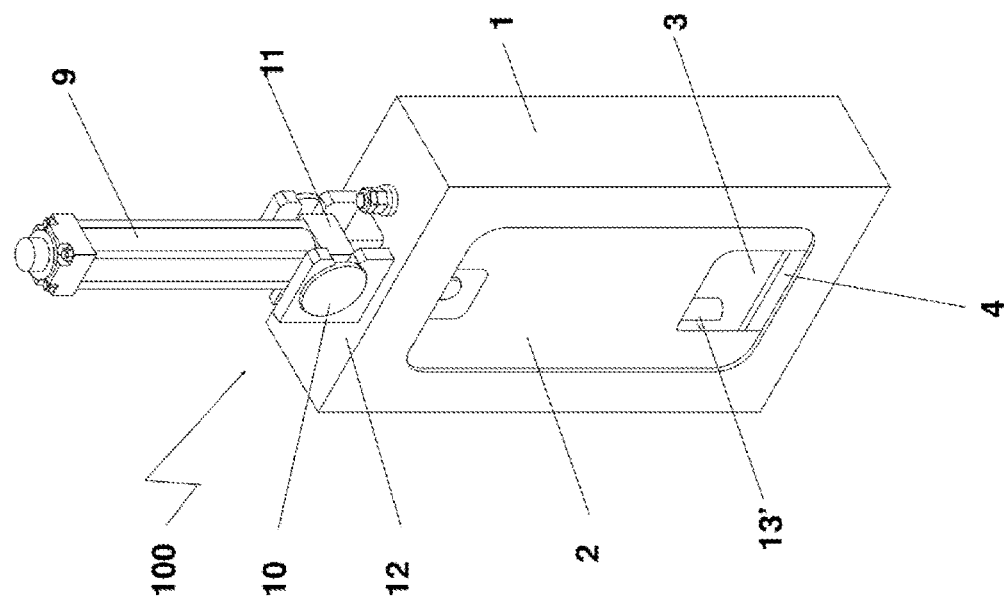
FIG. 1 shows an axonometric view of the device of the invention in rest position.
Figure 5:
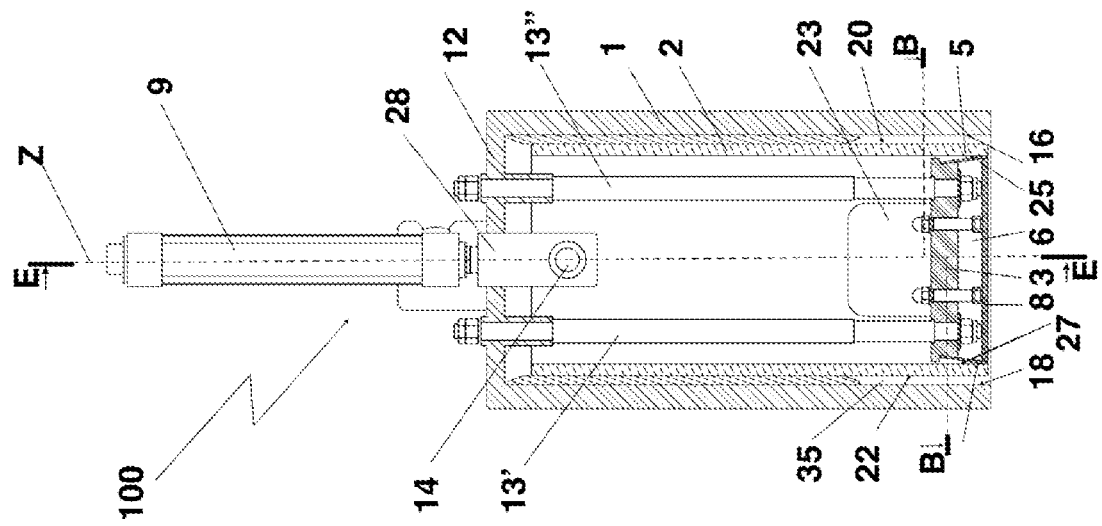
FIG. 5 shows a section, obtained from plane A-A in FIG. 4, of the device in rest position, cross-sectioned along the plane transverse to the rolling direction.

The beginning of operations starts with leaving the rest configuration shown in FIG. 1 and reaching the one shown in FIG. 2, which is obtained with the sliding movement of the protective shield 2 along the longitudinal axis Z thereof outside the outer container 1 in which it is initially accommodated, up to minimizing the meatus between the peripheral surfaces of the billets and the edges of the passage hole 23.

This configuration prevents the sparks and splatters of melted material from reaching the surrounding machinery because the possible deposit of material could indeed generate preferential paths for the passage of the current, and therefore short-circuits.

There is no barrier below the billets because the rolling lines generally are positioned above a drainage channel, in jargon called "flushing" channel, and a possible dispersal of splatters of melted material in such a direction would not constitute a danger or disadvantage of particular importance.

A particularly advantageous alternative of use is given by the continuous movement of the protective shield 2 during the welding operations, consisting of alternating small sliding movements of the protective shield, by mere way of example, with a stroke having a value ranging between 5 and 50 mm in direction parallel to the longitudinal axis Z. With this movement, the four scraping blades 4, 5, 6, 7 continuously scrape over the respective inner contact surfaces 24, 25, 26, 27 of the protective shield 2 for a stroke having limited range and continuously or intermittently over the period of duration of the welding, thus keeping clean the attachment area. Such an alternating short-stroke sliding movement in direction Z reduces the risk of possible blocks in the raising step due to the effect of the material deposited during welding. Should this happen, there would be a need to apply increased detachment forces to slide the protective shield 2 within the outer container 1.

In all the variants described thereof, the shield device 100 provides a system for measuring the stroke 40, which in cooperation for example, with a proportional hydraulic valve, allows controlled movements of the protective shield 2 to be carried out.

Figure 8:
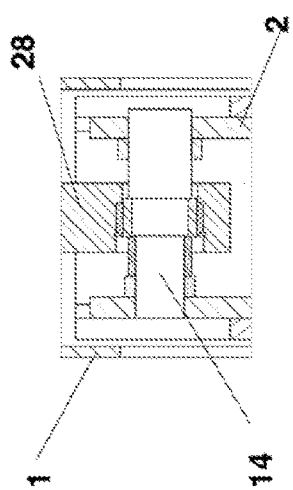
FIG. 8 shows an enlarged detail of FIG. 6.

Once the welding operation is complete, the protective shield 2 resumes the initial rest position by linearly sliding in direction of axis Z and in this step, the cleaning of the shield device, in particular of the protective shield 2, occurs due to interference. Indeed, with the sliding movement of the inner surface of the protective shield 2 over the scraping blades 4, 5, 6, 7 as detailed in FIG. 8, all the metal deposits are eliminated, thus maintaining the optimal operating features of the tools.

Figure 10:
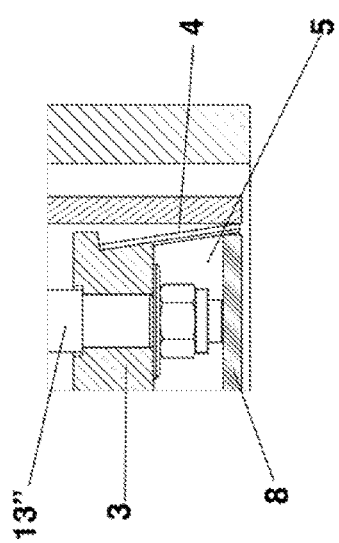
FIG. 10 shows an enlarged detail of FIG. 6.
Figure 6:
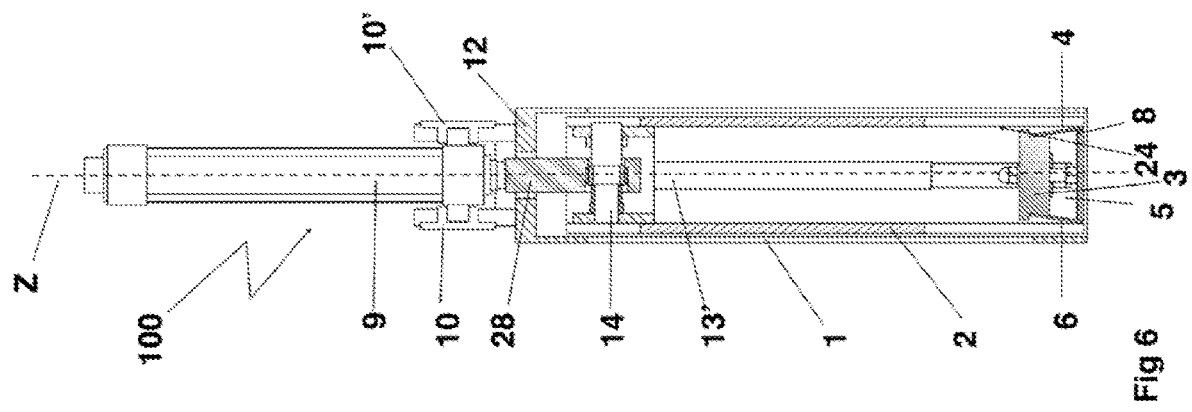
FIG. 6 shows a cross section, in rest position, along the plane transverse to the device, obtained from plane E-E in FIG. 5.

FIG. 10 highlights the roles of the rectangular stiffening plate 8, which in addition to being a guide for the scraping blades 4, 5, 6, 7, increases the rigidity thereof, thus preventing them from being deformed on the edges during the cleaning operations, thus reducing the efficiency of the scraping action thereof. Not less important is the advantage resulting from a shielding function from becoming soiled. The stiffening plate 8, combined with a particular position of the scraping blades 4, 5, 6, 7, results in the presence of further components such as the guillotine devices for protecting the cleaning tool 3 from splatters and sparks, not being required.

The device hereto illustrated therefore allows obtaining the protection from butt welding sparks and splatters in an affordable manner with a simplified system with respect to the prior art by limiting the number of components forming the device and therefore the cost of the works and operations.

The invention claimed is:

1. A weld splatter shield device for protection from splatter induced by a billet welding system, the shield device defining a rectilinear longitudinal axis Z and comprising:
   a protective shield having a first inner cavity defined by first inner surfaces and comprising a hole for a passage of billets at an outer side of the protective shield;
   a cleaning device for cleaning the first inner surfaces, which is arranged in the first inner cavity;
   actuating means capable of causing the protective shield to slide relatively to the cleaning device, in a direction parallel to the rectilinear longitudinal axis Z; and
   an outer container having an axis coincident with the rectilinear longitudinal axis Z, and having a second inner cavity defined by second outer surfaces of the outer container;
   wherein the protective shield has first outer surfaces and is contained in the second inner cavity such that the second inner surfaces face the first outer surfaces, and wherein the protective shield has outer dimensions compatible with the dimensions of the second inner cavity, so as to be capable to slide in the second inner cavity along a direction parallel the rectilinear longitudinal axis Z.

2. The shield device according to claim 1, wherein there are provided fixing means immovably and rigidly joining the outer container to the cleaning device, wherein the fixing means comprise at least one rod parallel to said rectilinear longitudinal axis Z.

3. The shield device according to claim 1, wherein the shape of the outer container and the protective shield is parallelepiped.

4. The shield device according to claim 1, wherein the first inner surfaces are flat.

5. The shield device according to claim 1, wherein the cleaning device comprises four scraping blades, each scraping blade being arranged at a respective surface of said first inner surfaces and inclined by an angle other than 0° with respect to a plane of the respective surface.

6. The shield device according to claim 1, wherein the cleaning device comprises a lower stiffening plate.

7. The shield device according to claim 1, wherein the cleaning device contains one or more holes for a passage of a refrigerant fluid.

8. The shield device according to claim 1, wherein, in an operative position, said shield device is arranged with the rectilinear longitudinal axis Z perpendicular to a feeding line of the billets to be welded.

9. The shield device according to claim 1, wherein there are provided cooling means of the cleaning device.

10. A method of cleaning a shield device, defining a rectilinear longitudinal axis Z and comprising a protective shield having a first inner cavity defined by first inner surfaces and comprising a hole for a passage of billets at an outer side of the protective shield, a cleaning device for cleaning the first inner surfaces, which is arranged in the first inner cavity, actuating means capable of causing the protective shield to slide relatively to the cleaning device, in a direction parallel to the rectilinear longitudinal axis Z, and an outer container having an axis coincident with the rectilinear longitudinal axis Z having a second inner cavity defined by second outer surfaces of the outer container, wherein the protective shield has first outer surfaces and is contained in the second inner cavity such that the second inner surfaces face the first outer surfaces, and wherein the protective shield has outer dimensions compatible with the dimensions of the second inner cavity, so as to be capable to slide in the second inner cavity along a direction parallel the rectilinear longitudinal axis Z, the method comprising the following steps:

arranging the shield device above welding surfaces of the billets perpendicularly to a feeding line of the billets to be welded;

causing the protective shield to slide from a rest position thereof in a direction parallel to the rectilinear longitudinal axis Z so as to arrange the hole for the passage of billets around the billets;

performing a butt welding operation between two successive billets;

at the end of the butt welding operation, returning said protective shield to said rest position by a sliding movement in a direction parallel to the rectilinear longitudinal axis Z.

11. The cleaning method according to claim 10, wherein during the butt welding operation, the actuating means are controlled to generate a cyclic sliding movement in a direction parallel to the rectilinear longitudinal axis Z between the protective shield and the cleaning device, corresponding to a cyclic scraping action between scraping blades of the cleaning device and the respective first inner surfaces of the protective shield.

* * * * *